United States Patent
Hillier et al.

(10) Patent No.: US 8,326,211 B1
(45) Date of Patent: Dec. 4, 2012

(54) COMPUTER SYSTEMS FOR CAPTURING STUDENT PERFORMANCE

(75) Inventors: James Hillier, Stanfield, NC (US);
James Pulliam, Pioneertown, CA (US);
Kathy Becker, Palm Springs, CA (US);
Will Richards, Santa Cruz, CA (US)

(73) Assignee: Distance EDU Learning, Inc., Las Vegas, NV (US)

( * ) Notice: Subject to any disclaimer, the term of this patent is extended or adjusted under 35 U.S.C. 154(b) by 786 days.

(21) Appl. No.: 12/137,466

(22) Filed: Jun. 11, 2008

Related U.S. Application Data (60) Provisional application No. 60/943,286, filed on Jun. 11, 2007, provisional application No. 60/943,267, filed on Jun. 11, 2007.

(51) Int. Cl.
*G09B 3/00* (2006.01)
*G09B 7/00* (2006.01)

(52) U.S. Cl. ......... 434/350; 434/322; 434/323; 434/353

(58) Field of Classification Search ................ 434/322, 434/323, 350, 353
See application file for complete search history.

(56) References Cited

U.S. PATENT DOCUMENTS

| | | | | |
|---|---|---|---|---|
| 5,310,349 A | * | 5/1994 | Daniels et al. | 434/350 |
| 5,779,486 A | * | 7/1998 | Ho et al. | 434/353 |
| 5,810,605 A | * | 9/1998 | Siefert | 434/362 |
| 6,149,438 A | * | 11/2000 | Richard et al. | 434/322 |
| 6,149,441 A | * | 11/2000 | Pellegrino et al. | 434/350 |
| 6,263,439 B1 | * | 7/2001 | Hondros et al. | 713/182 |
| 6,325,632 B1 | | 12/2001 | Chao et al. | |
| 6,430,549 B1 | | 8/2002 | Gershfield et al. | |
| 6,463,460 B1 | | 10/2002 | Simonoff | |
| 6,554,618 B1 | | 4/2003 | Lockwood | |
| 6,606,479 B2 | | 8/2003 | Cook et al. | |
| 6,652,287 B1 | * | 11/2003 | Strub et al. | 434/365 |
| 6,691,153 B1 | | 2/2004 | Hanson et al. | |
| 6,987,945 B2 | * | 1/2006 | Corn et al. | 434/350 |
| 6,988,138 B1 | | 1/2006 | Alcorn et al. | |
| 7,788,207 B2 | | 8/2010 | Alcorn et al. | |
| 2002/0042041 A1 | | 4/2002 | Owens et al. | |
| 2002/0064766 A1 | | 5/2002 | Cozens et al. | |
| 2004/0009461 A1 | * | 1/2004 | Snyder et al. | 434/350 |
| 2004/0048233 A1 | | 3/2004 | Matthews et al. | |
| 2004/0191744 A1 | | 9/2004 | Guirguis | |
| 2005/0028005 A1 | * | 2/2005 | Carson et al. | 713/200 |
| 2005/0202391 A1 | | 9/2005 | Allen et al. | |

(Continued)

OTHER PUBLICATIONS

Grush, Mary, "The Application Service Provider Model at Drexel", Feb. 14, 2007, campustechnology.com.

*Primary Examiner* — Xuan Thai
*Assistant Examiner* — Jerry-Daryl Fletcher
(74) *Attorney, Agent, or Firm* — Knobbe Martens Olson & Bear LLP (57) ABSTRACT

A method of capturing student performance can be provided that includes enabling a course creator to generate assessment data related to learning assessments for an online course and to generate learning outcomes for the online course, associating the assessment data with the learning outcomes, such that at least some of the learning assessments correspond to at least some of the learning outcomes, and generating an online classroom. The method may further include providing the learning assessments to students enrolled in the online course using the online classroom, wherein the students can generate completed learning assessments, and determining, for each of the completed learning assessments, whether one or more of the learning outcomes were met by each of the students.

5 Claims, 7 Drawing Sheets

U.S. PATENT DOCUMENTS

| | | |
|---|---|---|
| 2006/0216683 A1 | 9/2006 | Goradia |
| 2006/0228689 A1 | 10/2006 | Rajaram |
| 2007/0020604 A1 | 1/2007 | Chulet |
| 2007/0154876 A1 | 7/2007 | Harrison |
| 2007/0184426 A1* | 8/2007 | Packard et al. ............... 434/350 |
| 2008/0268418 A1 | 10/2008 | Tashner et al. |

* cited by examiner

Lesson Outcome Report
Lesson Outcome #1

| Student # | Homework 1 | Test 1 | Weighted Avg. | Outcome Met? (Threshold: 85) |
|---|---|---|---|---|
| Student 1 | 85 | 90 | 89 | Yes |
| Student 2 | 70 | 80 | 77 | No |
| Student 3 | 100 | 95 | 96 | Yes |
| Student 4 | 90 | 90 | 90 | Yes |
| Student 5 | 77 | 82 | 81 | No |

*FIG. 7*

COMPUTER SYSTEMS FOR CAPTURING STUDENT PERFORMANCE

CROSS-REFERENCE TO RELATED APPLICATIONS

This application claims priority from U.S. Provisional Application No. 60/943,286 filed Jun. 11, 2007, entitled "Performance capture in online learning environments," the disclosure of which is hereby incorporated by reference in its entirety. This application also claims priority from U.S. Provisional Application No. 60/943,267 filed Jun. 11, 2007, entitled "Accreditation-based course creation tools," the disclosure of which is hereby incorporated by reference in its entirety.

BACKGROUND

The Internet has provided educators with an efficient medium for delivering educational materials to a diverse, geographically remote audience. For example, many universities provide educational content to students via the Internet. Even some businesses offer continuing education and training to employees online. Online classes might include presentations of video lectures, written lecture notes, and the like.

Student performance in classes, including online classes, is often measured by grades. Grades can include letters, numbers, or other symbols indicating the relative quality of a student's work. Students receive grades based on their performance on various assessments, such as tests, quizzes, papers, and the like. Grades alone, however, provide only an approximate measure of student performance.

SUMMARY OF CERTAIN EMBODIMENTS

In various embodiments, a computer-implemented method of capturing student performance can be provided that includes enabling a course creator to generate assessment data related to learning assessments for an online course and to generate learning outcomes for the online course, associating the assessment data with the learning outcomes, such that at least some of the learning assessments correspond to at least some of the learning outcomes, and generating an online classroom. The method may further include providing the learning assessments to students enrolled in the online course using the online classroom, wherein the students generate completed learning assessments, and determining, for each of the completed learning assessments, whether one or more of the learning outcomes were met by each of the students.

Additionally, in certain embodiments, a system for measuring student performance can include a course creation module that can enable a course creator to generate learning outcomes for an online course and associate learning assessments with the learning outcomes, such that at least some of the learning assessments correspond to at least some of the learning outcomes. The system may further include an online classroom module that can generate an online classroom and provide the learning assessments to students enrolled in the online course using the online classroom, wherein the students can generate completed learning assessments. In addition, the system may also include a performance capture module that determines, for each of the completed learning assessments, whether one or more of the learning outcomes were met by each of the students.

In certain embodiments, a system for capturing student performance in an online educational course includes a course creation module accessible by a creator of an online educational course. The course creation module can enable the course creator to generate learning assessments for the online course and learning outcomes. The learning outcomes can include course outcomes that each have a desired objective for students to achieve in the online course and lesson outcomes that each have a desired objective for the students to achieve from one or more lessons. Each of the lesson outcomes can be related hierarchically to at least one of the course outcomes. The course creation module can also enable the course creator to associate at least some of the learning assessments with the learning outcomes, such that the at least some of the learning assessments correspond to at least one of the lesson outcomes.

Additionally, the system may further include an online classroom module that generates an online classroom, provides the learning assessments to the students in the online classroom, and automatically grades at least some of the learning assessments to produce graded learning assessments. Moreover the system may also include a performance capture module that determines, for each of the graded learning assessments, whether one or more of the learning outcomes were met.

DETAILED DESCRIPTION OF CERTAIN EMBODIMENTS

Grades are used ubiquitously in education to provide approximate indicators of student performance. However, grades provide a one-dimensional view of student accomplishment. Grades themselves, for instance, tell how well students have performed relative to their peers but tell little about what students have learned. Likewise, grades fail to provide significant insights on how well a teacher has conveyed a subject to students.

Various embodiments herein describe enhanced systems and methods for capturing student performance. In certain embodiments, these systems and methods enable courses to be created based on desired learning outcomes. These learning outcomes may be associated with assessments. Student achievement of the learning outcomes may be measured based on their performance on the assessments. Likewise, teacher effectiveness may be gauged based on the students' learning outcome achievements.

Although the systems and methods described herein are described primarily in the context of online classes, these systems and methods may also be used with classes that are not conducted online. In addition, the systems and methods herein are not restricted to classes conducted by schools, but may also be used in corporate training, certificate programs, and other educational settings.

The features of these systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, hardware and/or software modules, or components on one or more computers, such as servers. While the various modules are illustrated separately, they may share some or all of the same underlying logic or code.

Figure 1:
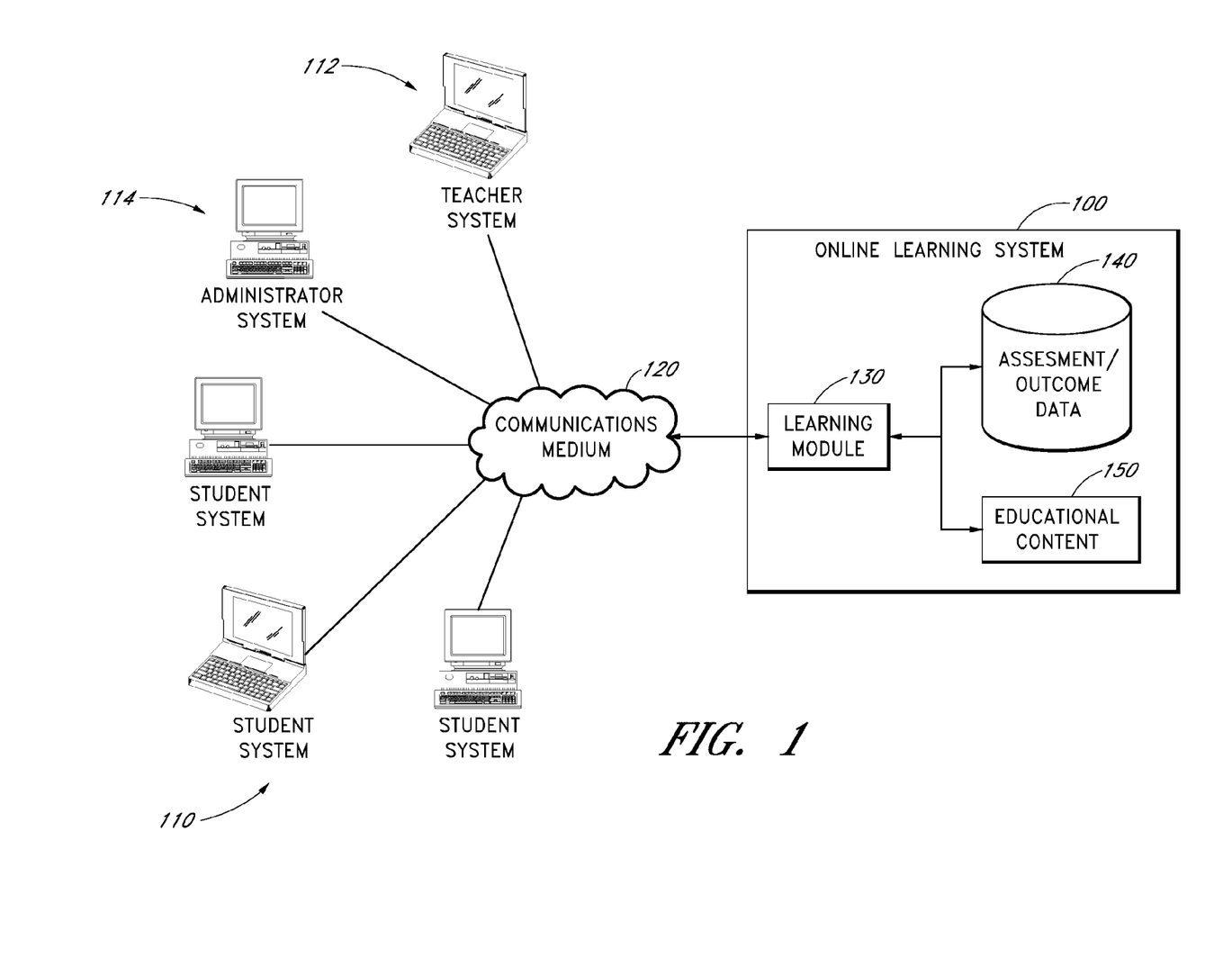
FIG. 1 illustrates a block diagram of an embodiment of an online learning system.

FIG. 1 illustrates an embodiment of an online learning system 100. The depicted embodiment of the online learning system 100 includes software components that can be implemented using one or more computer systems, such as servers (not shown). In certain embodiments, the online learning system 100 enables teachers and/or administrators to create courses according to desired learning outcomes. Advantageously, in certain embodiments the online learning system 100 captures student progress toward reaching the learning outcomes.

The online learning system 100 may be accessed by users such as students, teachers, and/or administrators over a communications medium 120 such as the Internet, a local or wide area network (LAN or WAN), or the like. The users can access the online learning system 100 using computer systems 110, 112. The computer systems 110, 112 can be any processor-based systems, such as desktops, laptops, tablet computers, personal digital assistants (PDAs), smart phones, ultra-portable computers, and the like. Students may access the online learning system 100 using the computer systems 110 to enroll in courses, receive instruction in interactive online classes, complete assessments, and the like. Teachers may access the online learning system 100 using the computer systems 112 to provide instruction to students, to create and manage courses, and the like. Administrators may also be able to access the online learning system 100 using the computer systems 114 to create courses, supervise instruction, and perform other administrative tasks.

In the depicted embodiment, the online learning system 100 includes a learning module 130, a database 140, and a file system 150. The learning module 130 can include one or more software components. In one embodiment, the learning module 130 is a software application server that provides access to applications, data, and the like.

In certain embodiments, the learning module 130 provides an online classroom in which students can receive instruction and take assessments. The online classroom may include one or more user interfaces for students, teachers, and administrators to access educational content on the file system 150 and/or in the database 140. The educational content can include, for example, multimedia presentations, lecture material, course files, and the like. The online classroom can also access student, teacher, and administrator personal data stored in the database 140 and/or file system 150. The user interfaces can be accessed by web browsers installed on the student, teacher, and administrator computer systems 110, 112, 114. Alternatively, an application other than a web browser can be used to access the online classroom.

The learning module 130 can also enable course creators such as teachers or administrators to create online courses based on one or more desired learning outcomes. The desired learning outcomes can be objectives that course creators desire the students to achieve for a given course. Course creators may generate the learning outcomes based on accreditation requirements in some embodiments. Accreditation requirements can include standards or desired competencies for courses defined by accreditation entities, such as the Accreditation Board for Engineering and Technology (ABET). For example, each accreditation requirement for a given course can be used as a learning outcome for that course. Alternatively, course creators may generate the learning outcomes based on the course creators' own criteria for student accomplishment. Course creators may also generate learning outcomes based on a combination of accreditation requirements and the course creators' own criteria.

Course creators can use the learning module 130 to associate the learning outcomes with assessments. Example assessments can include tests, exams, quizzes, essays, papers, projects, labs, presentations, oral reports, homework, research, class attendance, class participation, combinations of the same, and the like. An assessment associated with a learning outcome may test a student's mastery of the learning outcome. As an example, one possible learning outcome in an English class might be that students learn to recognize different sentence structures. An assessment associated with this learning outcome might test students on the different sentence structures.

The learning module 130 can measure students' learning outcome performance based at least in part on the students' performance on their assessments. For example, if a student performed well on an assessment such as a test, the learning module 130 may consider the student to have achieved a learning outcome associated with that test. The learning module 130 may store learning outcome results of students in the database 140, generate learning outcome reports for teachers and administrators, and recommend tutoring or other help to students who are not meeting learning outcomes. Using the learning outcome reports, teachers can also identify which students might need additional help. Teachers can also use the learning outcome reports self-diagnostically. If learning outcomes were missed by a number of students, for instance, teachers can identify areas where they may wish to adjust their teaching. Moreover, administrators can analyze learning outcome reports to supervise teachers.

Figure 2:
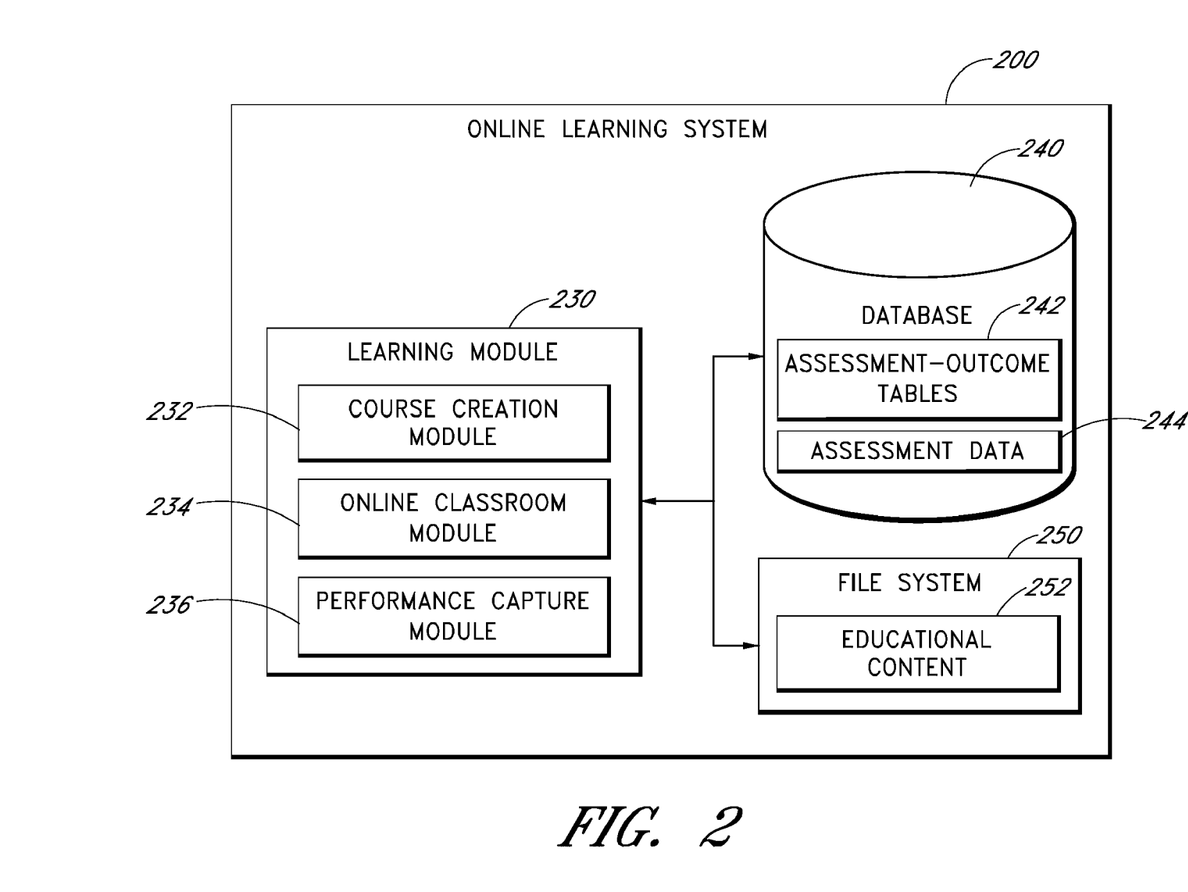
FIG. 2 illustrates a block diagram of another embodiment of the online learning system of FIG. 1.

FIG. 2 illustrates another embodiment of an online learning system 200. The depicted embodiment of the online learning system 200 includes software components that can be implemented using one or more computer systems, such as servers (not shown). The online learning system 200 includes a learning module 230, a database 240, and a file system 250. These components may have some or all of the same functionality described above with respect to FIG. 1, as well as additional functionality described below. In certain embodiments, the online learning system 200 advantageously enables teachers and administrators to define learning outcomes for capturing student performance.

The learning module 230 in the depicted embodiment includes a course creation module 232, an online classroom module 234, and a performance capture model 236. The learning module 230 may include more or fewer components in other embodiments.

The course creation module 232 can be a software component for creating courses, such as online courses. The course creation module 232 may be used by course creators such as teachers and administrators to create the online courses. When creating the online courses, course creators can use the course creation module 232 to define, import, or otherwise create learning outcomes. For instance, the course creation module 232 can allow course creators to import learning outcomes and assessments from previously-generated courses, which may be stored in the database 240 or file system 250.

Figure 3:
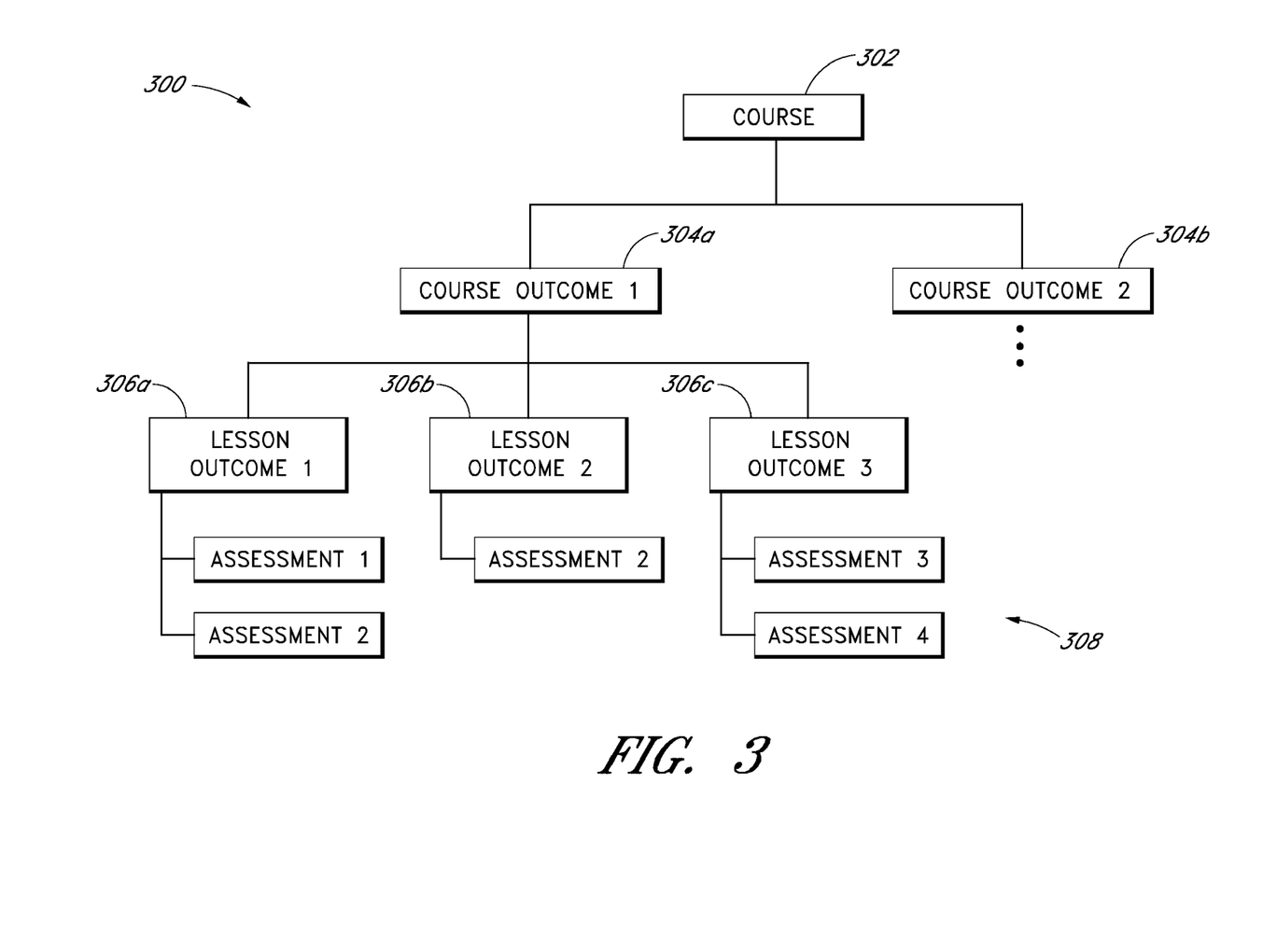
FIG. 3 illustrates a block diagram of an embodiment of learning outcomes that may be used with the online learning system of FIG. 1 or 2.

The learning outcomes can be subdivided into different types of learning outcomes. To illustrate, FIG. 3 depicts an embodiment of learning outcomes 300 that are subdivided into course outcomes 304 and lesson outcomes 306. The learning outcomes 300 are arranged hierarchically. For a given course 302, one or more course outcomes 304 may be defined. The course outcomes 304 may be overall objectives for students to achieve by the end of the course 302. Examples of course outcomes 304 for a geometry course 302 might include: "By the end of this course, students should be able to compute the area of common shapes" and "By the end of this course, students should be able to prove common geometric theorems." Two course outcomes 304a, 304b are shown for illustrative purposes; however, any number of course outcomes 304 may be defined for a given course 302.

For one or more of the course outcomes 304, there are one or more lesson outcomes 306 shown. For clarity, lesson outcomes 306 are shown for only the course outcome 304a, although lesson outcomes 306 may also be defined for the course outcome 304b. Each of the lesson outcomes 306 may be narrower in scope than the course outcome 304 with which it is associated. The lesson outcomes 306 can therefore support the course outcomes 304 in certain embodiments. Example lesson outcomes 306 might include: "By the end of this lesson, students should be able to compute the area of triangles" and "By the end of this lesson, students should be able to compute the area of parallelograms."

Each of the lesson outcomes 306 may be further associated with one or more assessments 308. The assessments 308 can be given to students to measure their progress toward completing the lesson outcomes 306, which can in turn show the progress of students toward completing the course outcomes 304. For example, a quiz on "computing the area of parallelograms" could be provided as an assessment 308 that supports the lesson outcome 306 of "By the end of this lesson, students should be able to compute the area of parallelograms." Thus, by measuring students' performance on the assessments 308, the students' performance toward completing the learning outcomes 300 can be captured.

While the assessments 308 are depicted as each relating to one lesson outcome 306, the assessments 308 may also relate to multiple lesson outcomes 306 and/or course outcomes 304. For example, after three lessons have been taught, an assessment 308 such as a test that covers the learning outcomes 306 from all three lessons might be given to students. Likewise, lesson outcomes 306 can be associated with multiple course outcomes 304. Additionally, the assessments 308 may be taken outside of a lesson or class. Moreover, some course outcomes 304 may not be associated with any lesson outcomes 306. The hierarchy of learning outcomes 300 shown may also have fewer or more levels.

Referring again to FIG. 2, once course creators have created learning outcomes, they may use the course creation module 232 to develop lessons that support those learning outcomes. The learning outcomes can therefore be a blueprint for developing a course in some implementations. Course creators may also use the course creation module 232 to generate assessments to gauge student progress in achieving the learning outcomes. The course creation module 232 may store the assessments, data on correct answers for the assessments (where applicable), corresponding grade values for the assessments (where applicable), and the like as assessment data 244 in the database 240.

Course creators can use the course creation module 232 to associate some or all of the learning outcomes with assessments and to store the associations in one or more assessment-outcomes tables 242 in the database 240. The course creation module 232 can also allow course creators to create criteria for determining whether learning outcomes have been met. These criteria can also be stored in the assessment-outcomes tables 242.

One example of such criteria is grade thresholds. For some assessments, course creators can define grade thresholds that indicate a minimum (or maximum) grade that satisfies a given learning outcome. For example, a grade of 75 out of 100 might be used as a threshold grade, such that students receiving a 75 or above will be considered to have achieved a learning outcome. The threshold may be in the form of a percentage, a raw number, a letter grade, or the like. The threshold may also be as simple as a "Pass" grade on a pass/fail assessment.

Grade thresholds may also be used for portions of assessments. For example, teachers may give multiple grades to an assessment. An English paper, for instance, might be assigned one grade for content and another grade for grammar. Each grade of multi-grade assessments may have a threshold that corresponds to different learning outcomes. The thresholds can be the same or different. Referring again to the English paper example, the content grade might be given a threshold of "75" (on a 0-100 scale), whereas the grammar grade might be given a threshold of "85."

Another example criteria for determining achievement of learning outcomes is based on questions of assessments, rather than (or possibly in addition to) grades. For instance, individual questions within an assessment may be assigned to one or more learning outcomes. Questions 1-3 on a test, for example, might relate to one learning outcome, while questions 4-10 relate to another learning outcome. Thus, answering a certain question, number of questions, percentage of questions, or subparts of questions correctly can demonstrate achievement of one or more learning outcomes. In addition, one question or set of questions can correspond to multiple learning outcomes.

The course creation module 232 can allow course creators to weight assessments or portions thereof. For example, one assessment might be given a higher weight than another assessment in determining whether learning outcomes have been met. Similarly, subparts of assessments, such as questions, can be assigned different weights in determining whether learning outcomes have been met. Moreover, one subpart of an assessment (e.g., a question), can have multiple weightings for different outcomes. For example, one question might be related 25% to one lesson outcome and 75% to another lesson outcome.

Other example criteria that can be defined for achieving learning outcomes include the percentage of completion of an assessment (e.g., the percentage of classes attended by students). In addition, when the learning outcomes include both lesson and course outcomes, the criteria for achievement of a course outcome can be based on the number lesson outcomes achieved, the percentage of lesson outcomes achieved, or the like. Many other criteria may be defined for determining learning outcome achievement in various embodiments.

In certain embodiments, the online classroom module 234 generates the online classroom described above with respect to FIG. 1. The online classroom can be used by teachers to provide classroom instruction. In addition, the online classroom can include interfaces for giving assessments to students. The online classroom module 234 can store completed assessments in the assessment data 244. In addition, in some implementations, the online classroom module 234 can automatically grade at least some of the assessments. For example, the online classroom module 234 can access an answer key or the like stored in the assessment data 244 and compare the students' answers with the answer key. In other embodiments, at least some of the assessments are graded manually by a teacher, teacher's assistant, or the like. Some papers, for instance, might be graded by hand. Teachers can input manually-generated grades into the online learning system 200 using the online classroom module 234. The online classroom module 234 can store automatically or manually generated grades in the assessment data 244.

In certain embodiments, the performance capture module 236 can retrieve the completed assessments and other assessment data 244 from the database 240 or directly from the online classroom module 234. The performance capture module 236 can then analyze the completed assessments according to the criteria described above to determine whether learning outcomes were achieved. For example, the performance capture module 236 can compare the assessment data 244 to the criteria described above, such as grade thresholds or the like, to determine whether learning outcomes have been met. The performance capture module 236 can store its analysis in the database 240. In addition, the performance capture module 236 can generate reports on student performance and provide these reports to teachers, administrators, students, and the like. One example of a report is described below with respect to FIG. 7. Moreover, the performance capture module 236 can provide these reports to accreditation entities to show evidence of compliance with accreditation standards.

Figure 4:
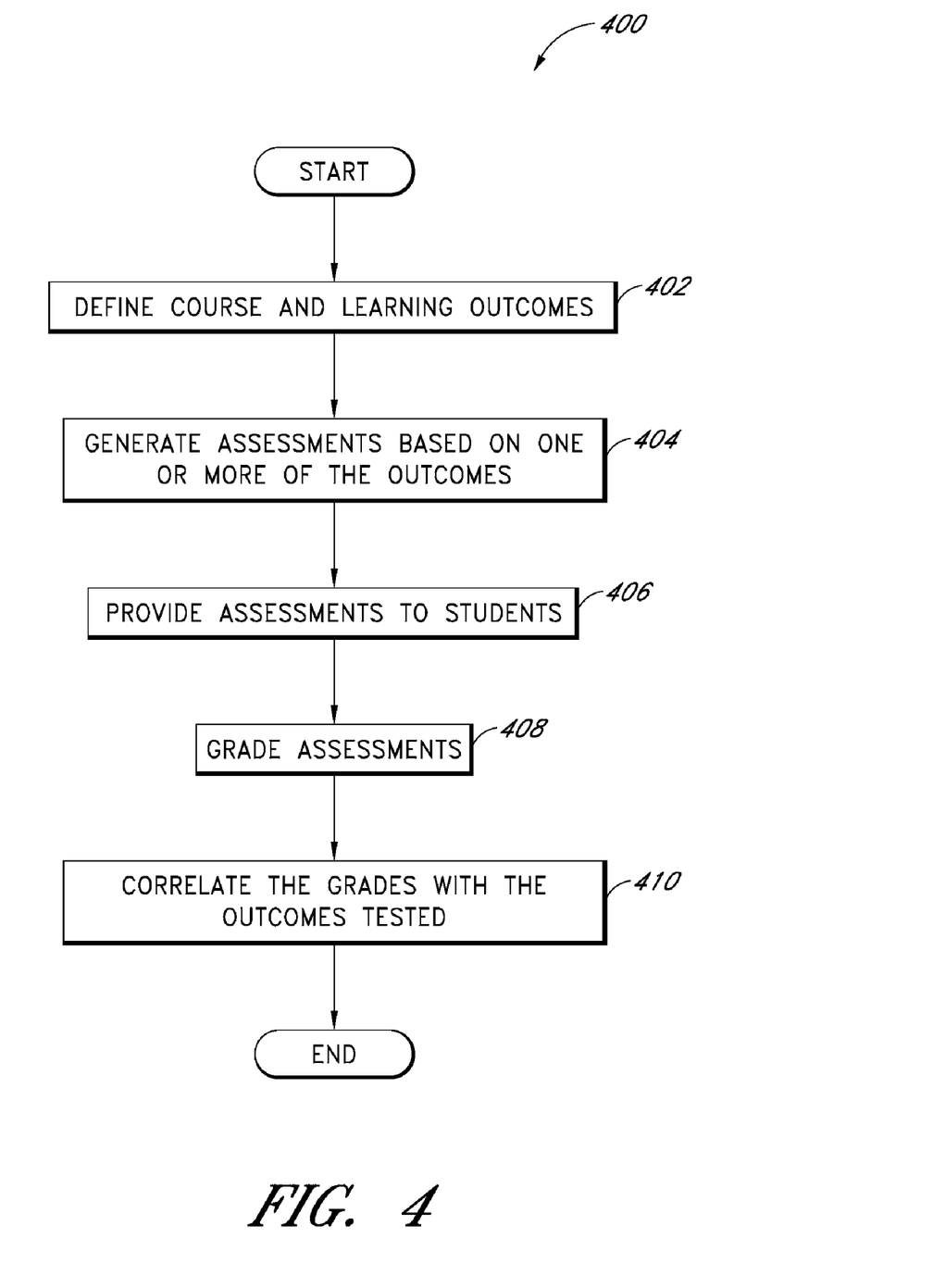
FIG. 4 illustrates a flow chart diagram of an embodiment of a process for capturing student performance.

FIG. 4 illustrates an example process 400 for capturing student performance. The process 400 can be performed by any of the online learning systems described above, such as the online learning systems 100 or 200. In particular, in certain embodiments, the course creation module 232, online classroom module 234, and performance capture module 236 described above can perform certain aspects of the process 400. Advantageously, in certain embodiments, the process 400 enables teachers or administrators to capture student performance.

At block 402, course and learning outcomes are defined. The course and learning outcomes can be defined using, for example, the course creation module 232. The course and learning outcomes can indicate objectives to which students should aim to achieve. At block 402, assessments are generated based on one or more of the outcomes. Each of the assessments can relate to one or more of the outcomes. This block 402 may also be implemented by the course creation module 232.

At block 406, the assessments are provided to students. Assessments can be taken by the students online in an interactive classroom using, for example, the online classroom module 234. At block 408, the assessments are graded. The assessments may be automatically graded by the performance capture module 236. Alternatively, the assessments can be hand-graded by a teacher, teacher's assistant, or the like. In the case of hand-graded assessments, the hand grades can be entered into the database 240 using the online classroom module 234 or the like.

At block 410, the grades are correlated with the outcomes tested to determine student and teacher progress with meeting performance goals. Block 410 may also be performed using the performance capture module 236. The individual questions may also be correlated with outcomes tested. More generally, any part of an assessment may be correlated with one or more learning outcomes.

Figure 5:
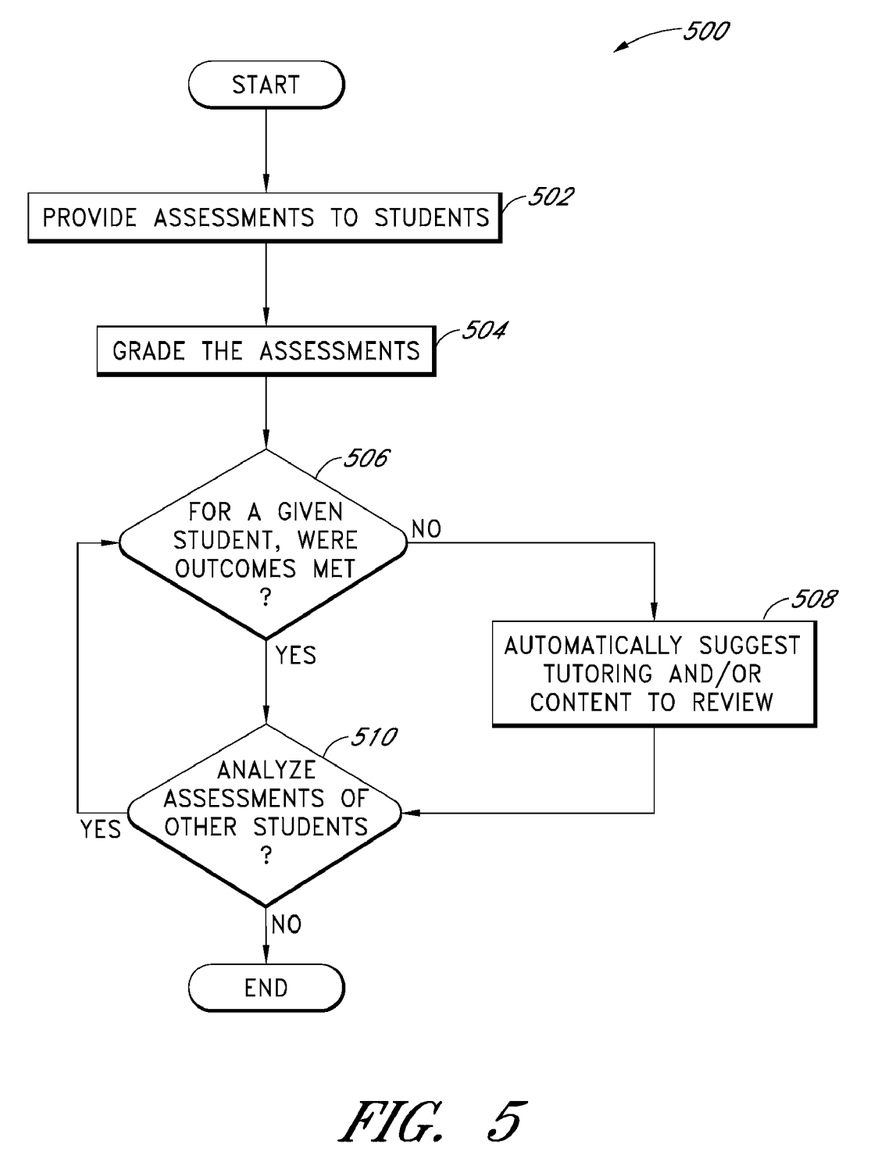
FIG. 5 illustrates a flow chart diagram of another embodiment of a process for capturing student performance.

FIG. 5 illustrates another embodiment of a process for capturing student performance. Like the process 400, the process 500 may be implemented by any of the online learning systems described above, such as the online learning systems 100 and 200. In particular, in certain embodiments, the online classroom module 234 and the performance capture module 236 described above can perform certain aspects of the process 500. Advantageously, in certain embodiments, the process 500 enables students to receive additional help if they are having difficulty achieving learning outcomes.

At block 502, assessments are provided to students. The assessments may be provided, for example, by the online classroom module 234. The remaining blocks 504-510 of the process 500 may be implemented by the performance capture module 236. At block 504, the assessments may be graded automatically or by hand. In the case of hand-grading, the grades may be entered into the performance capture module 236.

At block 506, it is determined for a given student whether one or more learning outcomes were met. This determination may include, for instance, analyzing assessments to determine if grades exceeded a predetermined threshold. If a student failed to achieve one or more outcomes, at block 508 tutoring can be automatically recommended to the student. Tutoring can be recommended, for example, by the performance capture module 236 sending an electronic message regarding tutoring to the student. The student may be recommended online tutoring for additional review in the subject matter of the one or more learning outcomes the student missed. The online tutoring may be performed in one embodiment using the online tutoring system described in U.S. patent application Ser. No. 12/137,422, filed Jun. 11, 2008, entitled "Computer systems and methods for providing online tutoring," the disclosure of which is hereby incorporated by reference in its entirety. Instead of tutoring, the student may be provided with additional content to review at block 508. This additional content may include lecture notes, outside reading material, or the like.

At block 510, it is determined whether to analyze the assessments of other students. If so, then the process 500 loops back to block 506. Otherwise the process 500 ends.

Figure 6:
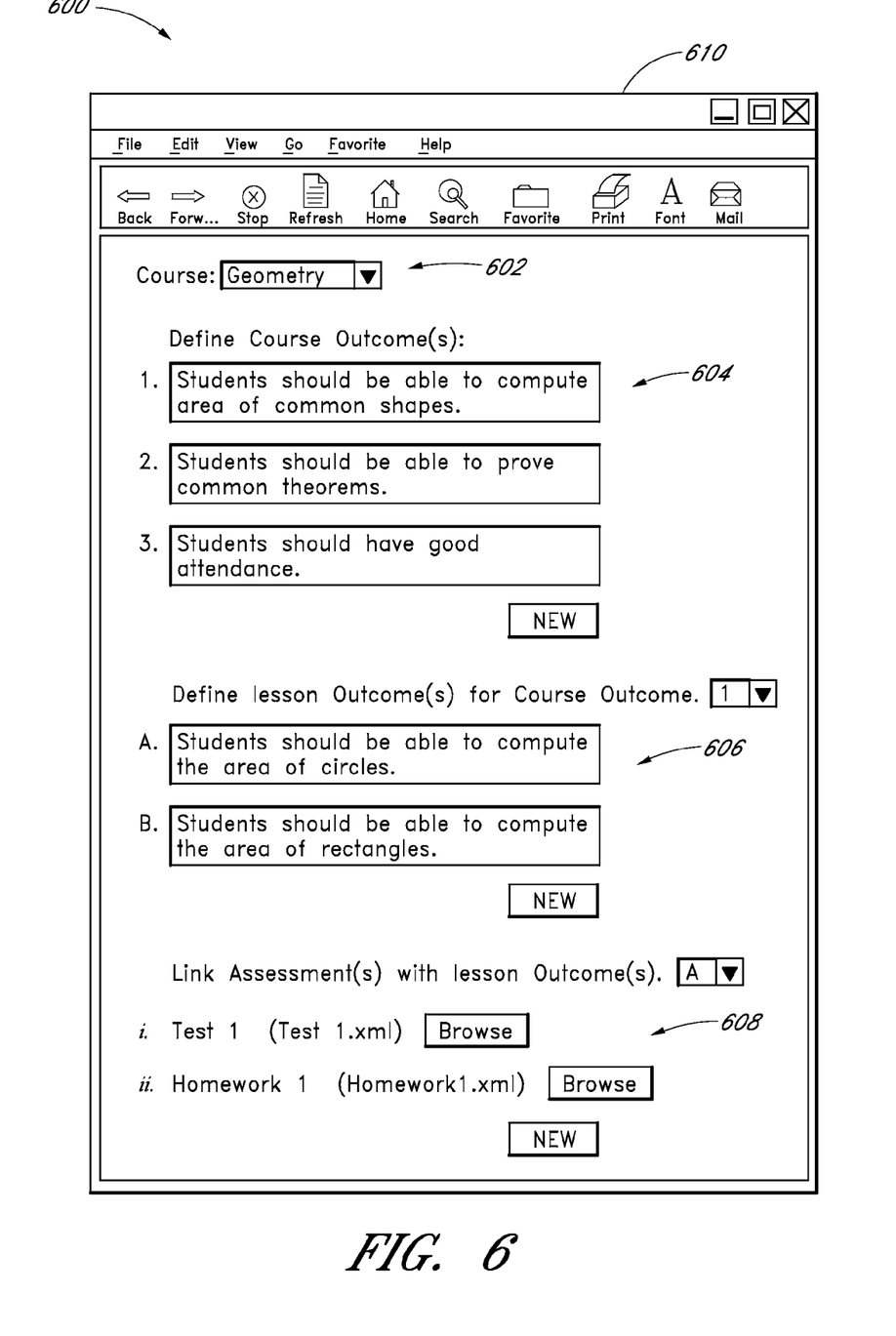
FIG. 6 illustrates an example user interface for creating an online course based on learning outcomes.

FIG. 6 illustrates an example course creation display 600 for creating an online course based on learning outcomes. The course creation display 600 may be generated by any of the online learning systems described above, including the online learning systems 100 and 200. In particular, in certain embodiments the course creation display 600 may be generated by the course creation module 232.

The example course creation display 600 is depicted in a web browser 610. In other embodiments, the course creation display 600 can be accessed using an application other than a web browser. The course creation display 600 may be included as part of several displays used to create a course. In certain embodiments, the course creation display 600 enables a course creator, such as a teacher or administrator, to create learning outcomes for a course.

The example course creation display 600 includes user interface controls 602 for selecting a course and user interface controls 604 for defining course outcomes for the selected course. The user interface controls 604 for defining course outcomes include text boxes in the depicted embodiment for entering descriptive text of a course outcome. For each course outcome, there are additional user interface controls 606 for creating lesson outcomes. These user interface controls 606 also include text boxes for entering descriptive text of a lesson outcome.

Similarly, user interface controls 608 may be used to link assessments with lesson and/or course outcomes. The user interface controls 608 include "Browse" buttons in the depicted embodiment for searching for assessment files. Other controls may be provided in certain embodiments for generating assessments from scratch. The assessments shown ("Test1.xml" and "Homework1.xml") are in extensible markup-language (XML) format. The XML format can be used in certain embodiments to facilitate parsing of answers from the assessments. However, many other formats can be used for the assessments in other embodiments.

Figure 7:
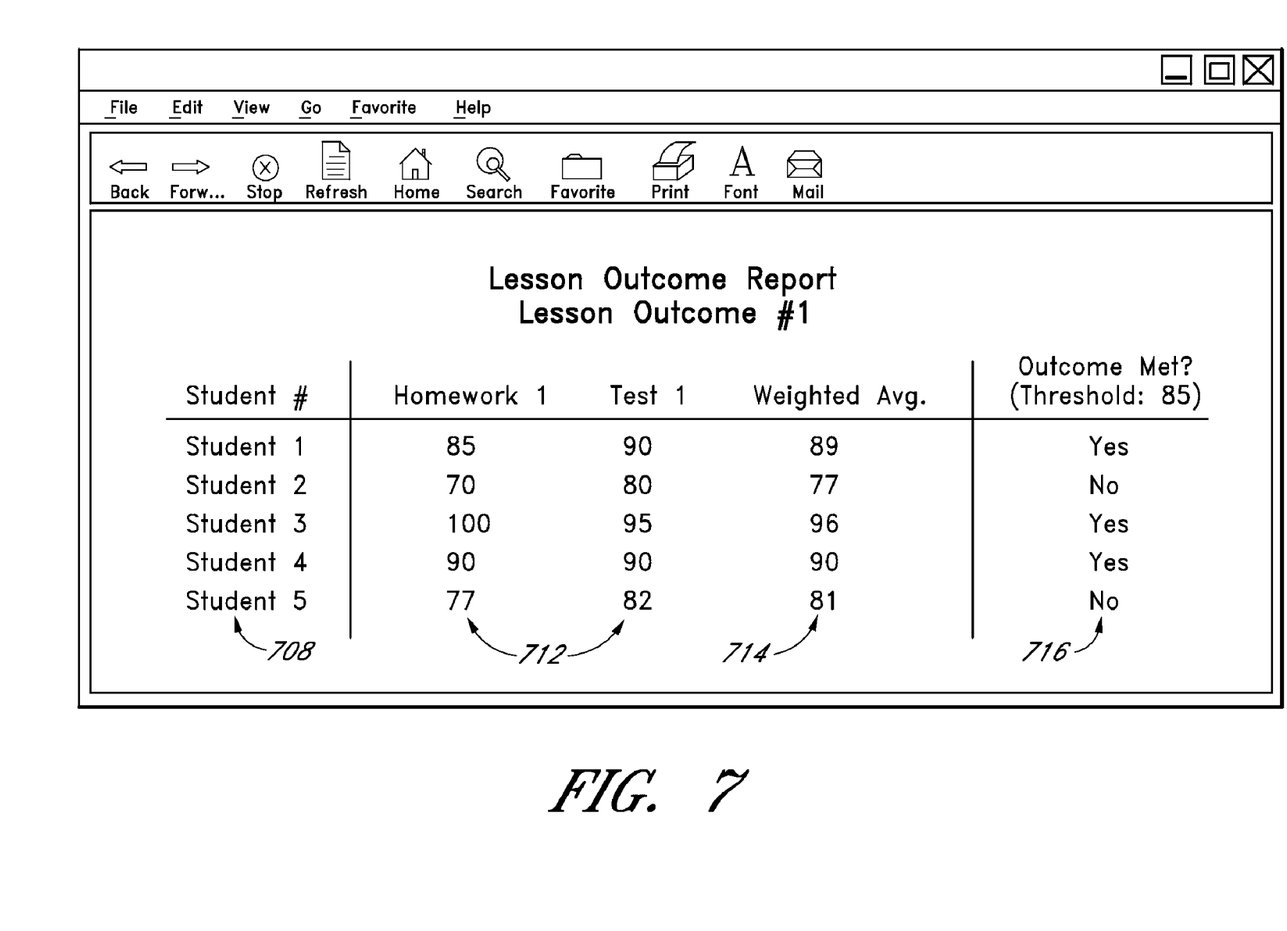
FIG. 7 illustrates an example report on student performance based on learning outcomes.

FIG. 7 illustrates an example report display 700 for a report on student learning outcome performance. The report display 700 may be generated by any of the online learning systems described above, including the online learning systems 100 and 200. In particular, in certain embodiments the performance capture module 236 can generate the report display 700. The report display 700 may be used by a teacher, for example, to evaluate the progress of students in achieving learning outcomes.

The example report display 700 of the online classroom is depicted in a web browser 710. In other embodiments, the report display 700 can be accessed using an application other than a web browser. The report display 700 illustrates a lesson outcome report showing lesson outcome results for several students 708. For each student 708, assessment grades 712 corresponding to the depicted lesson outcome are shown in tabular format. The assessment grades 712 are combined into an average grade 714, which in the depicted embodiment is a weighted average.

Lesson outcome results 716 are also shown for each student. Where the average grade 714 meets or exceeds a threshold (in the depicted example, "85"), the lesson outcome results 714 indicate that the student 708 met the lesson outcome. Otherwise, the lesson outcome results 714 indicate that the student did not meet the lesson outcome.

Conditional language used herein, such as, among others, "can," "could," "might," "may," and the like, unless specifically stated otherwise, or otherwise understood within the context as used, is generally intended to convey that certain embodiments may include, while other embodiments may not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors, including sub-processors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like. In certain embodiments, certain processes or modules described herein may be distributed over multiple processors or computers, such as servers.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for capturing student performance in an online educational course based on predefined learning outcomes, the system comprising:

a course creation module accessible by a creator of an online educational course, the course creation module configured to output a user interface comprising functionality for the course creator to generate learning assessments for the online course and learning outcomes based on course accreditation requirements, the learning outcomes comprising:

course outcomes, each of the course outcomes comprising a desired objective for students to achieve by the end of the online course, and lesson outcomes, each of the lesson outcomes comprising a desired objective for the students to achieve from one or more lessons, and each of the lesson outcomes being related hierarchically to at least one of the course outcomes;

wherein the learning outcomes are generated based at least in part on the course accreditation requirements, the course accreditation requirements comprising standards for a course defined by an accreditation entity;

the user interface further configured to:

enable the course creator to weight the learning assessments and subparts thereof, including individual questions of the learning assessments, to thereby enable the weights to be taken into account in determining whether the course accreditation-based learning outcomes have been met, and enable the course creator to associate at least some of the learning assessments with the learning outcomes and to associate the subparts of the learning assessments with one or more of the learning outcomes, such that the at least some of the learning assessments and the subparts thereof correspond to at least one of the lesson outcomes;

an online classroom module configured to:

generate an online classroom;

provide the learning assessments to the students in the online classroom, and automatically grade at least some of the learning assessments to produce graded learning assessments; and a performance capture module configured to:
- apply the weights to grades associated with the learning assessments to produce weighted graded assessments for course accreditation purposes, wherein said application of the weights comprises applying separate ones the weights to the subparts of the learning assessments;
- automatically determine, for each of the weighted graded learning assessments, whether one or more of the lesson outcomes were met by at least determining whether the weighted grades of the weighted graded learning assessments and the weighted subparts of the learning assessments meet or exceed one or more thresholds,
- determining a percentage of the lesson outcomes of a total number of the lesson outcomes that were achieved to determine whether the course outcomes were met, thereby indicating that the course outcomes were achieved;
- for one or more of the students who failed to achieve one or more of the learning outcomes, automatically recommending online tutoring to the one or more students for additional review in subject matter corresponding to the one or more learning outcomes; and
- submit a report on learning outcome achievements to the accreditation organization based on said determination to thereby show evidence of compliance by the course with the course accreditation requirements.

2. The system of claim 1, wherein the performance capture module is further configured to determine whether one or more of the learning outcomes were met by determining whether at least a portion of the graded learning assessments were completed.

3. The system of claim 1, wherein the course creator is a teacher or administrator.

4. The system of claim 1, wherein the learning assessments comprise one or more of tests, exams, quizzes, essays, papers, projects, labs, presentations, oral reports, homework, research, attendance, and class participation.

5. The system of claim 1, wherein at least one of the questions of the learning assessments corresponds to a plurality of the learning outcomes.

\* \* \* \* \*